(12) United States Patent
Miyamoto

(10) Patent No.: US 11,895,108 B2
(45) Date of Patent: Feb. 6, 2024

(54) SERVICE PROVIDING SYSTEM, LOGIN SETTING METHOD, AND INFORMATION PROCESSING SYSTEM

(71) Applicant: Shikou Miyamoto, Kanagawa (JP)

(72) Inventor: Shikou Miyamoto, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 299 days.

(21) Appl. No.: 17/227,508

(22) Filed: Apr. 12, 2021

(65) Prior Publication Data

US 2021/0336950 A1 Oct. 28, 2021

(30) Foreign Application Priority Data

Apr. 22, 2020 (JP) ................................ 2020-076214

(51) Int. Cl.
*H04L 29/06* (2006.01)
*H04L 9/40* (2022.01)
*H04N 1/44* (2006.01)

(52) U.S. Cl.
CPC ........ *H04L 63/0853* (2013.01); *H04L 63/083* (2013.01); *H04N 1/4413* (2013.01); *H04N 1/4426* (2013.01)

(58) Field of Classification Search
CPC . H04L 63/0853; H04L 63/083; H04L 9/3271; H04N 1/4413; H04N 1/4426; G06F 21/608
See application file for complete search history.

(56) References Cited

U.S. PATENT DOCUMENTS

| 7,421,503 | B1* | 9/2008 | Stieglitz | H04L 63/08 726/4 |
| 9,300,645 | B1* | 3/2016 | Rao | H04L 63/08 |
| 10,462,328 | B2* | 10/2019 | Iwahara | H04N 1/4433 |
| 2003/0046551 | A1* | 3/2003 | Brennan | H04L 63/0853 713/185 |
| 2008/0231887 | A1 | 9/2008 | Sakagami et al. | |
| 2010/0050247 | A1* | 2/2010 | Hashimoto | H04L 9/3213 726/10 |
| 2010/0146606 | A1* | 6/2010 | Delia | G06F 21/32 726/7 |

(Continued)

FOREIGN PATENT DOCUMENTS

JP 2008-244518 10/2008

OTHER PUBLICATIONS

U.S. Appl. No. 17/034,616, filed Sep. 28, 2020, Xiaofeng Han, et al.

*Primary Examiner* — Khalid M Almaghayreh
(74) *Attorney, Agent, or Firm* — IPUSA, PLLC

(57) ABSTRACT

A service providing system, a login setting method, and an information processing system. The service providing system includes an information processing system that stores a set value indicating whether a login is valid for each of the authentication methods, and transmits the set value for each of the authentication methods to the electronic device in response to a request from the electronic device, and the electronic device receives the set value for each of the authentication methods from the information processing system and changes a set value stored in the electronic device according to the set value of at least one of the authentication methods received from the information processing system.

9 Claims, 11 Drawing Sheets

(56) References Cited

U.S. PATENT DOCUMENTS

| | | | |
|---|---|---|---|
| 2013/0019287 A1* | 1/2013 | Foley | H04L 63/205 |
| | | | 726/4 |
| 2016/0065568 A1* | 3/2016 | Dave | H04L 63/0838 |
| | | | 726/4 |
| 2020/0125714 A1* | 4/2020 | Kubota | G06F 21/608 |

* cited by examiner

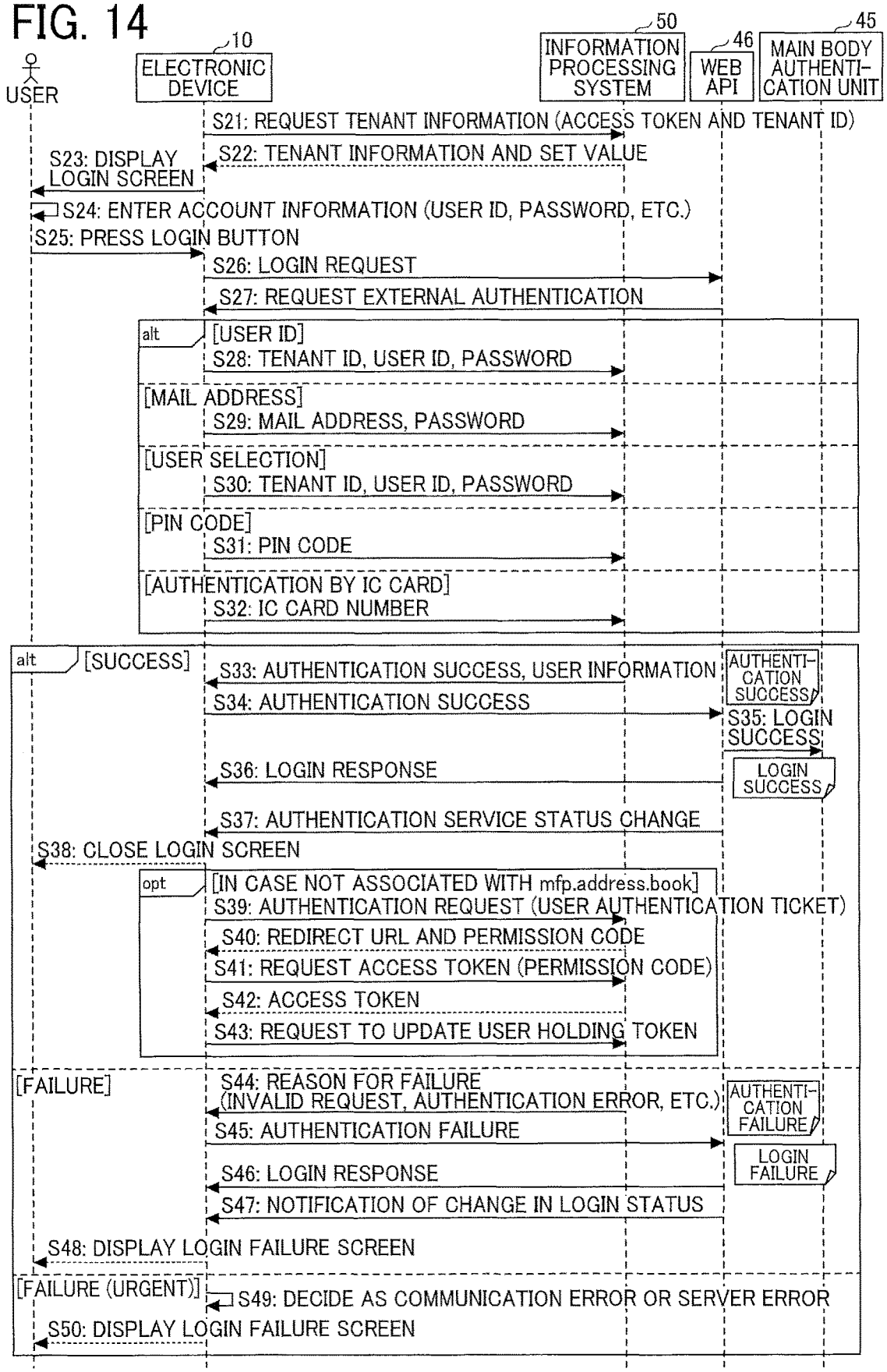

SERVICE PROVIDING SYSTEM, LOGIN SETTING METHOD, AND INFORMATION PROCESSING SYSTEM

CROSS-REFERENCE TO RELATED APPLICATIONS

This patent application is based on and claims priority pursuant to 35 U.S.C. § 119(a) to Japanese Patent Application No. 2020-076214, filed on Apr. 22, 2020, in the Japan Patent Office, the entire disclosure of which is hereby incorporated by reference herein.

BACKGROUND

Technical Field

The present disclosure relates to a service providing system, a login setting method, and an information processing system.

Related Art

Information processing systems that provide services such as applications and software to users through networks are known. The user can use the service provided by the information processing system from a terminal device by preparing a certain environment such as a terminal device such as a personal computer (PC), a web browser operating on the terminal device, and internet connection environment.

SUMMARY

Embodiments of the present disclosure describe a service providing system, a login setting method, and an information processing system. The service providing system includes an information processing system that stores a set value indicating whether a login is valid for each of the authentication methods, and transmits the set value for each of the authentication methods to the electronic device in response to a request from the electronic device, and the electronic device receives the set value for each of the authentication methods from the information processing system and changes a set value stored in the electronic device according to the set value of at least one of the authentication methods received from the information processing system.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 14 is a sequence diagram illustrating a process in which an information processing system authenticates a user using account information input to the login screen.

Figure 1:
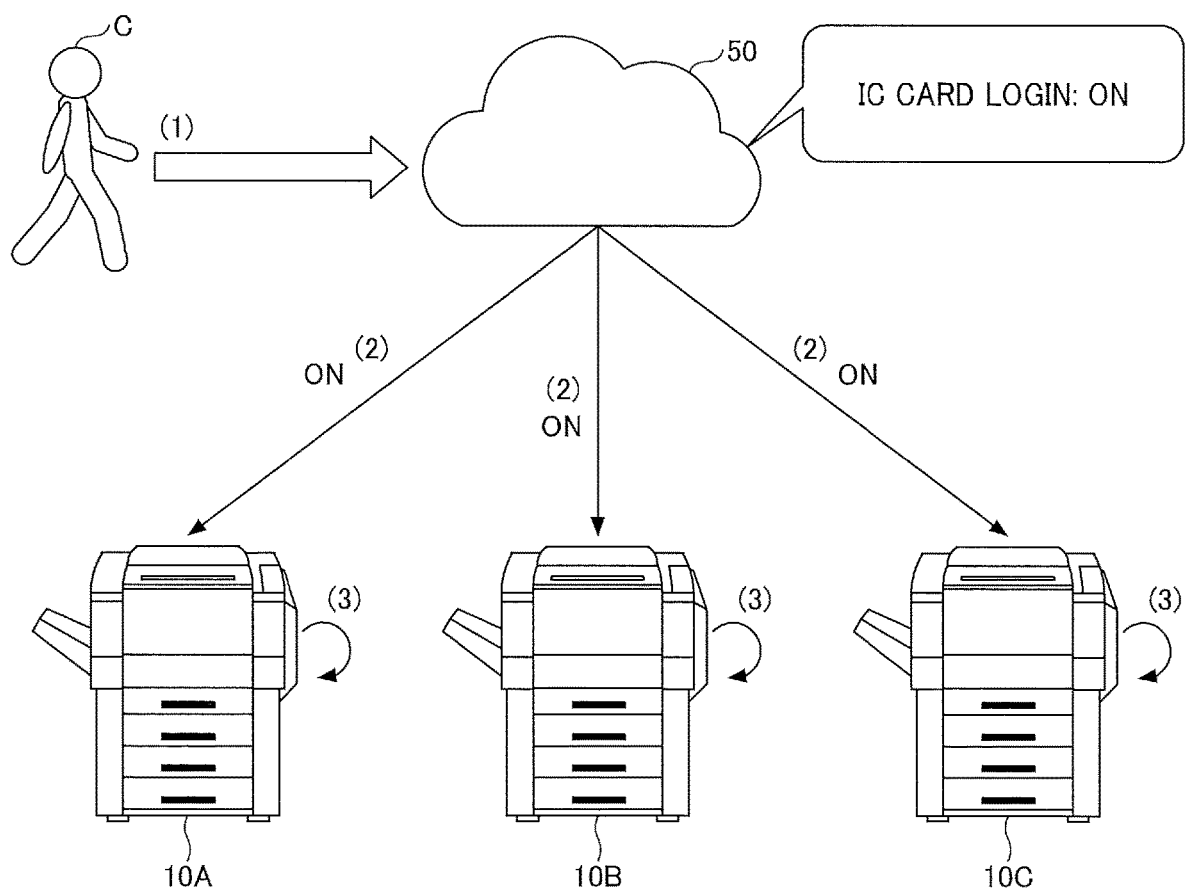
FIG. 1 is a diagram illustrating a method of setting an integrated circuit (IC) card login for each electronic device.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, as an example of embodiments for carrying out the present disclosure, a computer system and a login setting method performed by the computer system are described.

A setting of IC card login in a service providing system of the present disclosure is described with reference to FIG. 1. FIG. 1 is a diagram illustrating a method of setting IC card login for an electronic device.

(1) A tenant administrator (hereinafter, referred to as an administrator C) sets a value of "ON (valid)" or "OFF (invalid)" indicating whether a login to any of the image forming apparatuses 10A to 10C by each user with an IC card is permitted, on the information processing system 50 on the network. For example, in FIG. 1, an IC card login is set to "ON (valid)".

(2) Each of the image forming apparatuses 10A to 10C acquires the set value of the information processing system 50 periodically or at the timing when each image forming apparatus is started.

(3) Each of the image forming apparatuses 10A to 10C returns the set value to "ON (valid)" regarding the IC card login when the set value is changed from "OFF (invalid)" to "ON (valid)". When the set value is "ON (valid)", each of the image forming apparatuses 10A to 10C displays a login screen for the IC card login.

As described above, in the service providing system 1 of the present embodiment, the customer administrator C enables the IC card login setting in the information processing system 50 (server), and the set value is set to each of the image forming apparatuses 10A to 10C. Each of the image forming apparatuses 10A to 10C automatically acquires the set value, and the login with IC card can be automatically enabled.

The IC card is a card embedded with an IC for recording and calculating data. The IC card is also known as a smart card or chip card.

Examples of Information in the IC card includes information that identifies the user, such as card identification information, PIN number, and biometric authentication information. A password may be included as the information in the IC card. The information in the IC card may be referred to as the information required for login.

An authentication method refers to what information is to be used to authenticate the user (whether or not the user is a legitimate authorized person). In the present embodiment, a user ID, an e-mail address, a user selection, the PIN code, and the IC card are described as examples of the authentication methods. In addition, biometric authentication information may be used for the authentication. The authentication method may be called a login method.

Figure 2:
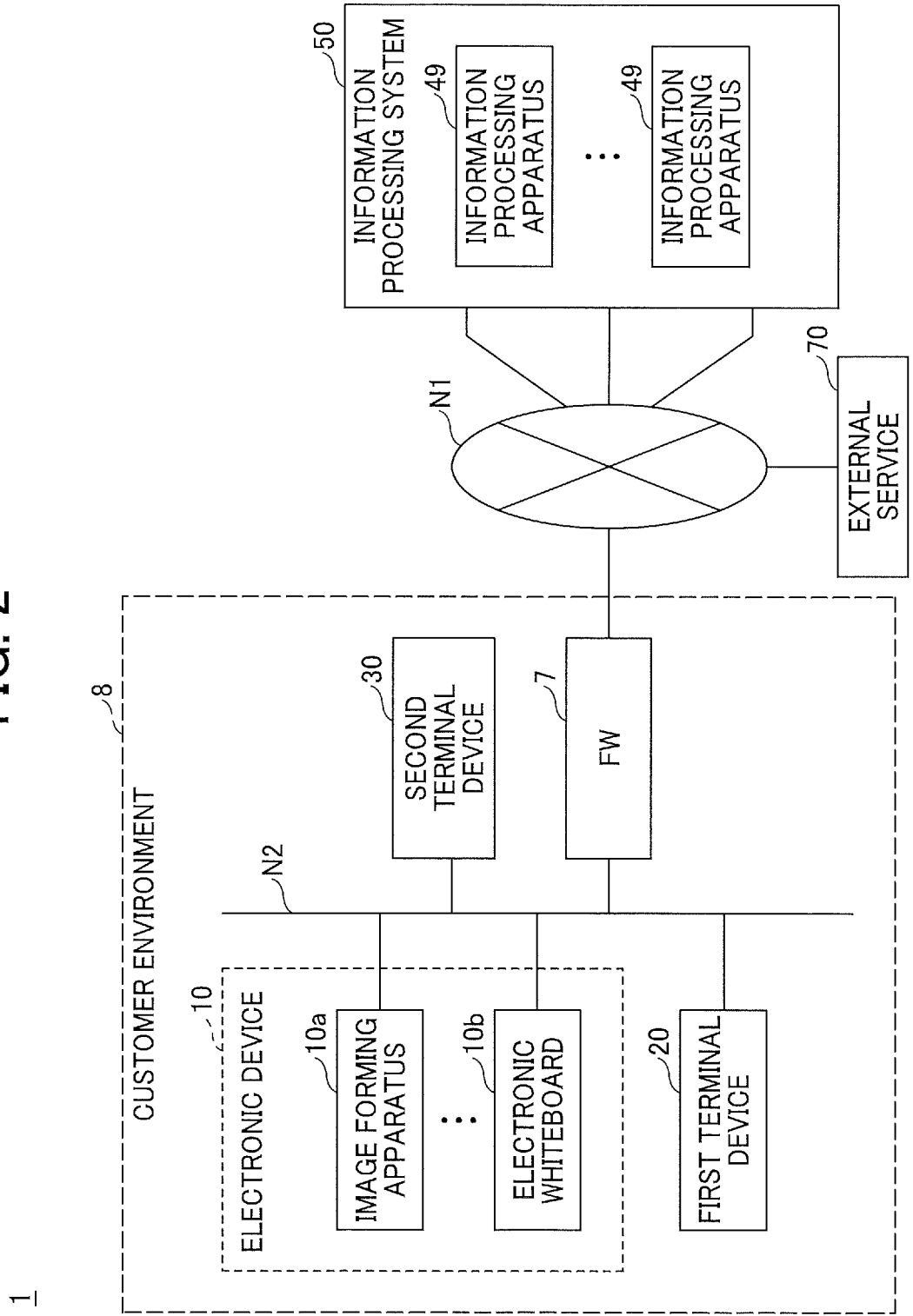
FIG. 2 is a block diagram illustrating a system configuration of an example of a service providing system.

FIG. 2 is a block diagram illustrating an example of a configuration of a service providing system 1 according to the present embodiment. In the service providing system 1 of FIG. 2, customer environment 8 is connected to the information processing system 50 through a network N1 such as the internet. The network N1 also includes a telephone network such as a mobile phone network.

A customer is a customer of a service provided by the information processing system 50, and examples of customer include an organization such as a company, an organization, an educational institution, an administrative organization, or a department. Those who have some kind of employment relationship with the customer are users. The users include general users and administrators. In the customer environment 8, one or more electronic devices 10, a first terminal device 20, a second terminal device 30, and a firewall (FW) 7 are connected through a network N2 such as a local area network (LAN). Further, the information processing system 50 includes one or more information processing apparatuses connected to the network N1.

The electronic device 10 is, for example, an image forming apparatus 10a, and the image forming apparatus 10a includes a laser printer, a multifunction printer (MFP), and the like. Further, as the electronic device 10, an electronic whiteboard 10b may also be mentioned. In addition, the electronic device 10 includes, for example, an output device such as a projector (PJ), a digital signage, a head up display (HUD) device, an industrial machine, an imaging device, a sound collecting device, a medical device, a network home appliance, and an automobile (a connected car), a notebook PC, a mobile phone, a smartphone, a tablet terminal, a game machine, a personal digital assistant (PDA), a digital camera, a wearable PC, a desktop PC, or the like.

The electronic device 10 of the present embodiment is a terminal on which the user registered in the information processing system 50 uses the service. The user logs in to the information processing system 50 from the electronic device 10, selects an application (application program) for which the user has authorization to use, and receives the service provided by the information processing system 50. As described above, the service is provided on an application by application basis.

The first terminal device 20 is an information processing device such as a smartphone, a mobile phone, a tablet PC, a desktop PC, or a notebook PC used by a general user. The first terminal device 20 is installed with a program having a screen display function such as a web browser. The program is not limited to the web browser as long as the program has a function of displaying screen information received from the information processing system 50 as a screen. A program dedicated to the information processing system 50 may be used.

The second terminal device 30 is an information processing apparatus such as the smartphone, the mobile phone, the tablet PC, the desktop PC, or the notebook PC used by the administrator. The second terminal device 30 is installed with a program including the screen display function such as the web browser. The program is not limited to the web browser as long as the program has a function of displaying the screen information received from the information processing system 50 as a screen. A program dedicated to the information processing system 50 may be used.

The firewall 7 is a device for preventing intrusion from the outside into the customer environment 8, and all communications from the customer environment 8 are monitored by the firewall 7. However, the above description does not apply when the first terminal device 20 and the second terminal device 30 communicate with the information processing system 50 through the telephone line such as the mobile phone network.

The information processing system 50 provides various services to the electronic device 10, the second terminal device 30 and the like through the network N1. The services vary depending on type of the electronic device 10. In the case of the image forming apparatus 10a, the services include uploading and saving a scanned document to the storage on the cloud and downloading and printing image data of the storage on the cloud, but the service are not limited to the services described here. In the case of the electronic whiteboard 10b, for example, the services include recognizing voice in real time and creating minutes, converting handwritten data into text, and the like. In the case of the second terminal device 30, for example, the services include a real-time translation service for web pages.

In the information processing system 50, a tenant and the user are associated with each other. The services (applications) that can be used are determined for each user, and the user uses the application that the user can use from the electronic device 10 or the first terminal device 20. In addition, tenants, administrators, and users have the following relationships. One customer has one tenant. In this case, the administrator and the user belong to one tenant. One customer has multiple tenants. In this case, the administrators do not necessarily belong to the tenants, but manage the users belonging to each tenant. The users belong to one or more tenants. In either case, the user registered in the information processing system 50 belongs to any of the tenants, so if the user is identified after registration, the tenant to which the user belongs is also identified.

The information processing system 50 creates screen information of a web page to be displayed on the first terminal device 20, the second terminal device 30, or the electronic device 10, and transmits the screen information to the first terminal device 20, the second terminal device 30, or the electronic device 10. For example, a login screen or the like, which is described below, is displayed.

The screen information is created by Hypertext Markup Language (HTML), Extensible Markup Language (XML), Cascade Style Sheet (CSS), JAVASCRIPT (registered trademark), and the like. The web page may be provided by web application 18. The web application 18 refers to software or a mechanism that is executed on a web browser and operates by coordinating a program in a programming language (for example, JAVASCRIPT (registered trademark)) that operates on a web browser with a program on the web server. The web page can be dynamically changed by the web application 18.

The external service 70 is one or more information processing apparatuses that mainly provide an authentication linkage service. For example, the external service provides the authentication linkage service such as OAuth, OAuth2.0, and OpenID Connect. The authentication linkage service is a mechanism that allows a user of the service to access the user's data hosted on the service to a third-party application without passing the user's account information (ID & password). OFFICE365 (registered trademark), GOOGLE (registered trademark), FACEBOOK (registered trademark), etc. are known as the authentication linkage services.

The configuration of the service providing system 1 illustrated in FIG. 2 is an example, and one or more server devices (proxy server, gateway server, etc.) may be interposed between the customer environment 8 and the information processing system 50. Further, the first terminal device 20 and the second terminal device 30 may be in an environment other than the customer environment, and may be connected to, for example, the network N1.

The information processing system 50 may be implemented by one information processing apparatus 49 or may be distributed and implemented by a plurality of information processing apparatuses 49. For example, each service may be provided by one information processing apparatus 49, one information processing apparatus 49 may provide a plurality of services, or a plurality of information processing apparatuses 49 may provide one service.

In the service providing system 1 of FIG. 2, the information processing system 50 is connected to the network N1 such as the internet outside the customer environment. In other words, the service providing system 1 of FIG. 2 is an example in which the information processing system 50 is provided in a cloud environment. However, the information processing system 50 may be provided inside the customer environment (on-premises environment).

Figure 3:
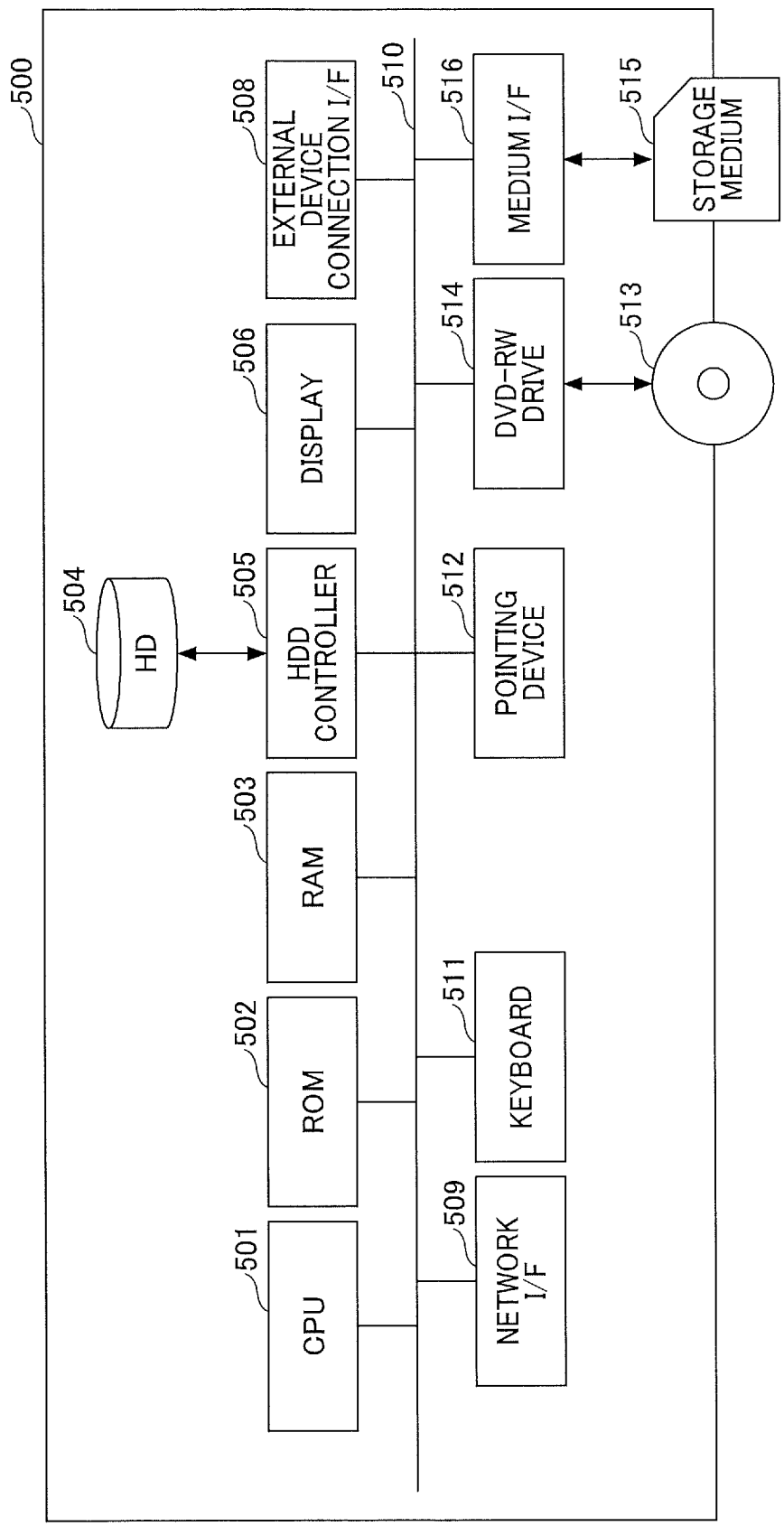
FIG. 3 is a block diagram illustrating a hardware configuration of an example of a computer.

The first terminal device 20, the second terminal device 30, or the information processing apparatus included in the information processing system 50 of FIG. 2 is implemented by, for example, a computer having a hardware configuration illustrated in FIG. 3. FIG. 3 is a block diagram illustrating an example of a hardware configuration of the computer. As illustrated in FIG. 3, the computer 500 is implemented by a computer including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc rewritable (DVD-RW) drive 514, and a medium I/F 516.

Among these elements, the CPU 501 controls entire operation of the computer. The ROM 502 stores a program such as an initial program loader (IPL) used for driving the CPU 501. The RAM 503 is used as a work area for the CPU 501. The HD 504 stores various data such as programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a universal serial bus (USB) memory or a printer. The network I/F 509 is an interface for performing data communication using a communication network. The bus line 510 is an address bus, a data bus, or the like for electrically connecting each component such as the CPU 501 illustrated in FIG. 3.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading or writing (storage) of data to a storage medium 515 such as a flash memory.

Figure 4:
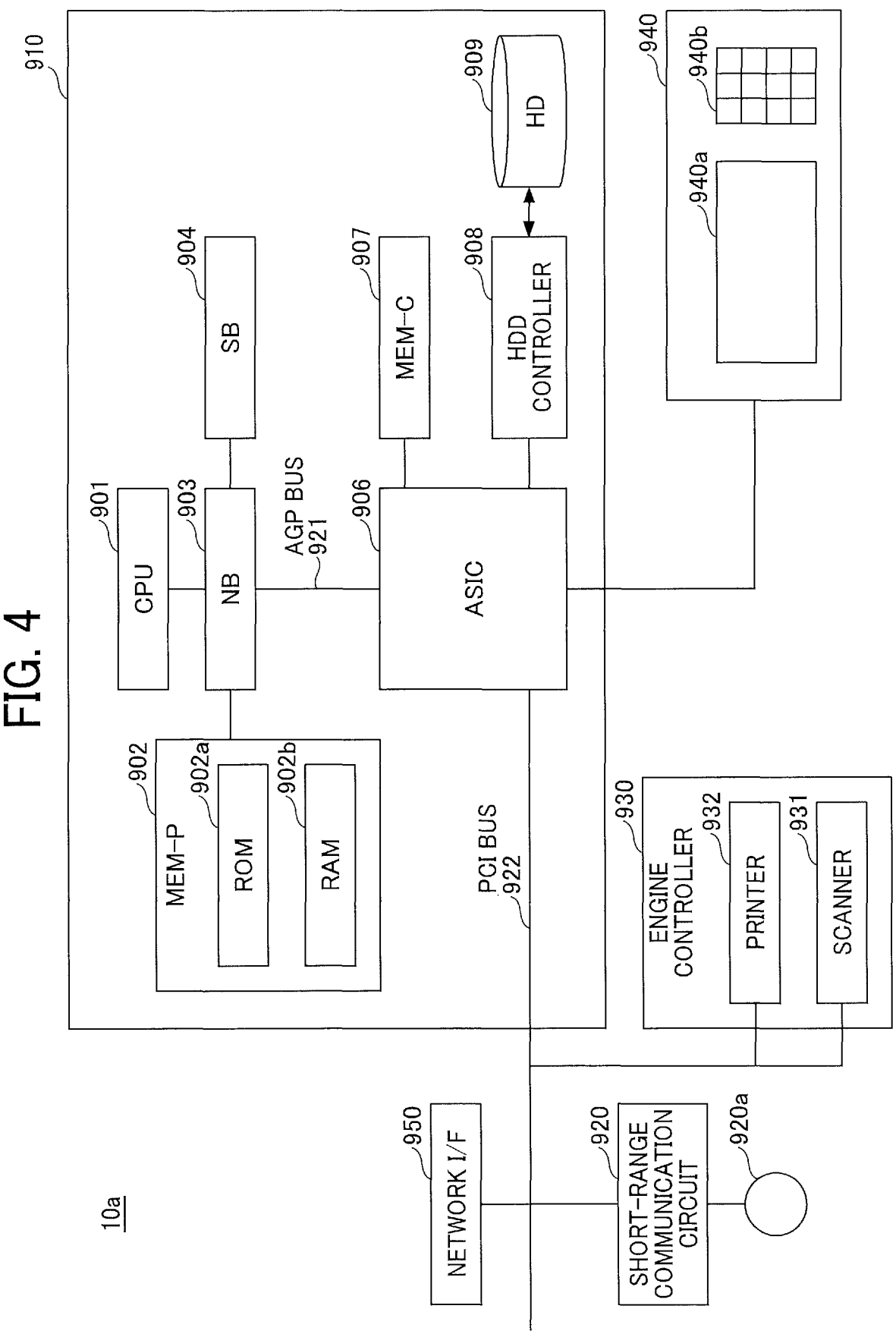
FIG. 4 is a block diagram illustrating a hardware configuration of an example of an image forming apparatus as an example of the electronic device.

FIG. 4 is a block diagram illustrating a hardware configuration of an example of an image forming apparatus 10*a* as an example of an electronic device 10. As illustrated in FIG. 4, the image forming apparatus 10*a* includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the image forming apparatus 10*a*. The NB 903 connects the CPU 901 with the MEM-P 902, SB 904, and AGP bus 921 and includes a memory controller for controlling reading or writing of various data with respect to the MEM-P 902, a Peripheral Component Interconnect (PCI) master, and an AGP target.

The MEM-P 902 includes a ROM 902*a* as a memory that stores program and data for implementing various functions of the controller 910 and further includes a RAM 902*b* as a memory that deploys the program and data, or as a drawing memory that stores drawing data for printing. The program stored in the ROM 902*a* may be stored in any computer-readable storage medium, such as a compact disc-read only memory (CD-ROM), compact disc-recordable (CD-R), or digital versatile disc (DVD), in a file format installable or executable by the computer, for distribution.

The SB 904 connects the NB 903 with a peripheral component interconnect (PCI) device or a peripheral device.

The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or a code buffer. The HD 909 is a storage for storing image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with Near Field Communication (NFC), BLUETOOTH (registered trademark) and the like.

The engine controller 930 includes a scanner 931 and a printer 932. The control panel 940 includes a display panel 940a implemented by, for example, a touch panel that displays current settings or a selection screen and receives a user input and an operation panel 940b including a numeric keypad that receives set values of various image forming parameters such as image density parameter and a start key that accepts an instruction for starting copying. The controller 910 controls entire operation of the image forming apparatus 10a. For example, the controller 910 controls drawing, communication, or user inputs to the control panel 940. The scanner 931 or the printer 932 includes an image processing unit such as error diffusion processing and gamma conversion processing.

In response to an instruction to select a specific application through the control panel 940, for example, using a mode switch key, the image forming apparatus 10a selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile mode is selected.

The network I/F 950 controls communication of data with an external device through the communication network. The short-range communication circuit 920 and the network I/F 950 are electrically connected to the ASIC 906 through the PCI bus 922.

Figure 5:
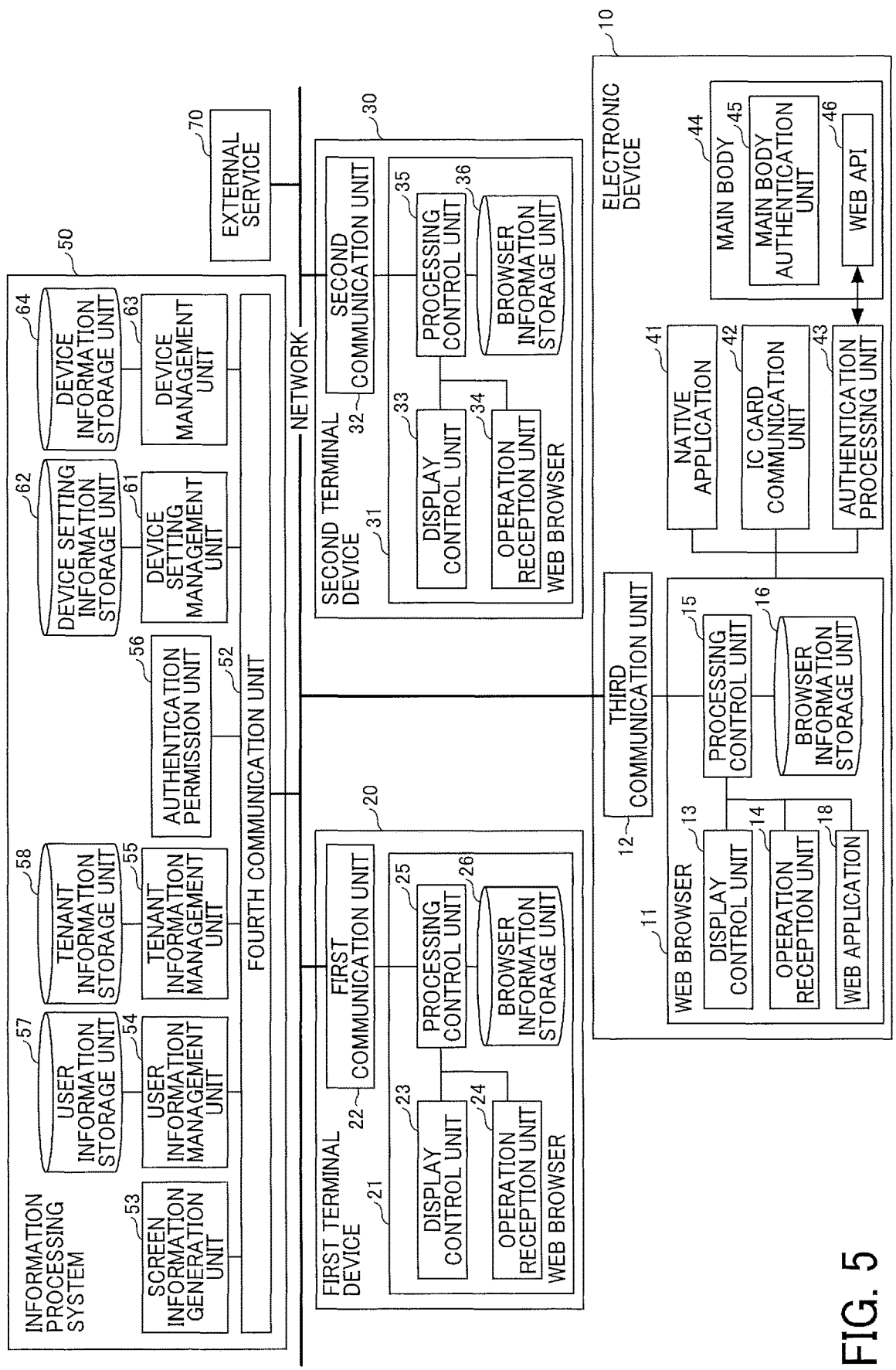
FIG. 5 is a block diagram illustrating functions of a first terminal device, a second terminal device, the electronic device, and an information processing system.

The function of each device of the service providing system 1 according to the present embodiment is implemented by, for example, a functional block illustrated in FIG. 5. FIG. 5 is a block diagrams illustrating functions of the first terminal device 20, the second terminal device 30, the electronic device 10, and an information processing system 50.

The first terminal device 20 includes a first communication unit 22, a display control unit 23, an operation reception unit 24, and a processing control unit 25. The first terminal device 20 implements a functional block as illustrated in FIG. 5 by executing a program (for example, a web browser 21).

The first communication unit 22 communicates with the information processing system 50 to send and receive various information for the first terminal device 20 to display an appropriate login screen.

The display control unit 23 analyzes the screen information of the screen received from the information processing system 50 and displays, for example, a login screen on the display 506. The operation reception unit 24 receives a user's operation (for example, input of account information on the login screen) on the first terminal device 20.

The processing control unit 25 determines the login screen displayed by the first terminal device and the like. For example, the processing control unit 25 instructs the display control unit 23 to display the login screen stored in the browser information storage unit 26. The processing control unit 25 is implemented by the engine of the web browser 21 executing JAVASCRIPT (registered trademark) included in the screen information.

Further, the first terminal device 20 includes a browser information storage unit 26 in which a program (for example, a web browser 21) stores information. The browser information storage unit 26 is built in, for example, HD 504 or the like, and is a non-volatile memory in which information is not deleted even when the web browser 21 is terminated. As a storage area in the terminal that can be managed by the web browser, a function called Local Storage implemented by HTML5 can be used. Details of the information stored in the browser information storage unit 26 is described together with the functions of the electronic device 10.

The second terminal device 30 includes a second communication unit 32, a display control unit 33, an operation reception unit 34, and a processing control unit 35. The second terminal device 30 implements a functional block as illustrated in FIG. 5 by executing a program (for example, a web browser 31).

The second communication unit 32 communicates with the information processing system 50 to send and receive various information for the second terminal device 30 to display an appropriate login screen.

The display control unit 33 analyzes the screen information of the screen received from the information processing system 50 and displays, for example, a login screen on the display 506. The operation reception unit 34 receives an administrator's operation (for example, input of account information on the login screen) on the second terminal device 30.

The processing control unit 35 determines the login screen displayed by the second terminal device and the like. For example, the processing control unit 35 instructs the display control unit 33 to display the login screen stored in the browser information storage unit 36. The processing control unit 35 is implemented by the engine of the web browser 31 executing JAVASCRIPT (registered trademark) included in the screen information.

Further, the second terminal device includes a browser information storage unit 36 in which a program (for example, a web browser 31) stores information. The browser information storage unit 36 is built in, for example, the HD 504 or the like, and is a non-volatile memory in which information is not deleted even when the web browser 31 is terminated. As a storage area in the terminal that can be managed by the web browser, a function called Local Storage implemented by HTML5 can be used.

FIG. 5 illustrates functions of the image forming apparatus 10a as an example of the electronic device 10, but the functions described in the present embodiment are the same in the other electronic device 10, except for the function implemented by difference in the hardware.

The electronic device 10 includes functions executed by the control panel 940 and functions executed by a main body 44. The main body 44 is a part of the electronic device 10 illustrated in FIG. 4 other than the control panel 940. This is because the control panel 940 and the main body 44 each have an independent information processing function, which is implemented by a CPU or the like that is independent from each other. The control panel 940 implements a part of functions illustrated in a functional block as illustrated in FIG. 5 by executing a program (for example, web browser 11) or a dedicated application. The functions of the main body 44 illustrated in FIG. 5 is implemented by executing the program.

The functions executed by the control panel 940 are a third communication unit 12, a display control unit 13, an operation reception unit 14, a processing control unit 15, a web application 18, a native application 41, an IC card communication unit 42 and an authentication processing unit 43. The functions executed by the main body 44 are a main body authentication unit 45 and a web Application Programming Interface (API) 46.

The third communication unit 12 communicates with the information processing system 50 and receives screen information for the electronic device 10 to display a standby screen, the login screen, an application screen, and the like. In addition, the information input by the user on the standby screen, login screen, and application screen is transmitted to the information processing system 50.

The display control unit 13 analyzes the screen information of the screen received from the information processing system 50 and displays, for example, the standby screen, the login screen, and the application screen on the control panel 940. The operation reception unit 14 accepts user operations (for example, input of account information, selection of an application, operation on an application, etc.) on the electronic device 10.

The processing control unit 15 performs common processing for the electronic device 10 that provides a solution to the user by using a service such as device registration or login in the information processing system 50. When the authentication setting of the electronic device 10 is system authentication, the processing control unit 15 operates as a system authentication application and returns the authentication result from the information processing system 50 to the main body authentication unit 45. The authentication ticket issued by the information processing system 50 to the user's account is shared by each application of the electronic device 10. The system authentication is the main body custom authentication in the cloud. A custom authentication application is added to the control panel 940, and the custom authentication application refers to an authentication method in which the cloud and authentication information are transmitted, and results are acquired. For example, the authentication is entrusted to a custom authentication application such as the authentication processing unit 43. Note that system authentication refers to authentication performed after the control panel 940 is started and before each application on the control panel 940 is used, as opposed to authentication for each application (custom authentication at the time of starting the application).

When the authentication setting of the electronic device 10 is not the system authentication, the processing control unit 15 receives a device registration or login request from an application that provides a solution using a service on the information processing system 50 and performs the processing request to the information processing system 50 on behalf of the information processing system 50, while displaying the screen. Results are returned only to the requested application. In the present embodiment, the case of system authentication is mainly described.

Since the screen displayed by the processing control unit 15 and the screen displayed by the web application 18 must be the same when the native application 41 requests device registration or login (for the same function), the WebView function of ANDROID (registered trademark) is used to implement the browser function and display the common screen with the web application 18 in the present embodiment.

The web application 18 is an application displayed and executed on the web browser on the control panel 940 of the electronic device 10. In order to provide a solution by using the service on the information processing system 50 as in the native application 41 described below, it is necessary to implement a device registration and login function in the information processing system 50.

The native application 41 is an application executed on the operating system (OS) running on the control panel 940 of the electronic device 10. When the native application 41 is started, the device registration status is acquired from the processing control unit 15. If the device is not registered, a registration request is transmitted to the processing control unit 15. The user executes device registration using the displayed registration screen. Even when it is necessary to log in to the information processing system 50, the native application 41 can use the processing control unit 15 to display a common authentication screen and receive the authentication result.

The IC card communication unit 42 receives information from the short-range communication circuit 920 and sends the information to the processing control unit 15. Specifically, an IC card number is received from the short-range communication circuit 920 and sent to the processing control unit 15. The IC card communication unit 42 is created according to the type of the short-range communication circuit 920 and the IC card.

The authentication processing unit 43 performs authentication processing in the system on the control panel 940 side according to the instruction of the processing control unit 15. In the present embodiment, the authentication result is notified to the main body authentication unit 45.

The main body 44 includes the web API 46 and the main body authentication unit 45. The web API 46 is an interface on the main body 44 that allows the control panel 940 to acquire settings of the main body 44 of the electronic device 10 and execute functions. Such an API is called a remote I/F. When the device is registered in the information processing system 50, the native application 41 or the web application 18 acquires the machine number of the electronic device 10 by using the web API 46.

The main body authentication unit 45 is an authentication service on the main body. When the authentication setting of the electronic device 10 is the system authentication, the main body authentication unit 45 receives the authentication result from the information processing system 50 through the control panel 940.

TABLE 1

|   | Authentication Method | Flag |
|---|---|---|
| A | User ID | userId |
| B | E-mail Address | email |
| C | User Selection | userselect |
| D | PIN Code | pincode |
| E | IC Card | iccard |
| F | All | all |

The authentication method as illustrated in Table 1 is stored in the browser information storage unit 16 of the electronic device 10. Table 1 illustrates examples of the authentication methods stored in the browser information storage unit 16. The authentication methods (A) to (F) are indicated in Table 1, together with flags that identify respective authentication methods. The processing control unit 15 identifies the stored authentication method by reading the flag.

For example, when the flag is "userId", the electronic device 10 displays a login screen corresponding to the authentication method using the user ID. When the flag is "email", the electronic device 10 displays a login screen corresponding to the authentication method using the e-mail address. When the flag is "userselect", the electronic device 10 displays a login screen corresponding to the authentication method by user selection. When the flag is "pincode", the electronic device 10 displays a login screen corresponding to the PIN code authentication method. When the flag is "iccard", the electronic device 10 displays a login screen corresponding to the authentication method using the IC card. When the flag is "all", the first terminal device 20 displays a login screen corresponding to all authentication methods.

The values of the flags in Table 1 indicate that the authentication methods are all "ON (valid)". The value indicating "OFF (invalid)" may be, for example, NULL or a blank. As described below, the electronic device 10 receives a set value from the information processing system 50 and sets the flag corresponding to the set value. In addition, the administrator can set the flag for each electronic device 10.

The information processing system 50 includes a fourth communication unit 52, a screen information generation unit 53, a user information management unit 54, a tenant information management unit 55, an authentication permission unit 56, a device setting management unit 61, and device management unit 63. These functions of the information processing system 50 are functions implemented by the CPU 501 of the computer 500 illustrated in FIG. 3 executing a program developed from the HD 504 to the RAM 503.

The fourth communication unit 52 transmits and receives various information to and from the first terminal device 20, the second terminal device 30, and the electronic device 10. For example, the screen information of the login screen is transmitted to the second terminal device 30, and the account information is received from the second terminal device 30. Further, the screen information of the standby screen, the login screen, a top screen (portal screen), and the application screen is transmitted to the electronic device 10. In addition, the information entered on these screens are received.

The screen information generation unit 53 generates screen information of various screens displayed by the first terminal device 20, the second terminal device 30, and the electronic device 10, and transmits to the first terminal device 20, the second terminal device 30, and the electronic device 10 through the fourth communication unit 52.

The user information management unit 54 manages the generation, update, acquisition, and deletion of user information in the user information storage unit 57. The tenant information management unit 55 similarly manages the information of the tenant to which the user belongs in the tenant information storage unit 58. The user and the tenant are associated with each other by the user information and the tenant information.

The device management unit 63 accepts registration of the electronic device 10 such as the image forming apparatus 10a and registers the electronic device 10 in the device information storage unit 64. The device setting management unit 61 receives a setting related to IC card login from the second terminal device 30 and stores the settings in the device setting information storage unit 62.

The authentication permission unit 56 authenticates the administrator or the user based on the account information and determines whether the authentication succeeds or fails. Authentication indicates determining whether or not a user is a legitimate authority. In the case of the present embodiment, the authentication determines whether the user or the administrator has the authority to use the information processing system 50, and the user or the administrator can also be distinguished. Authorization indicates determining the authority granted to a user according to a role of the user (described below). For example, the resources that can be accessed and the operations that can be performed are determined.

If the authentication is successful, the information processing system 50 allows the user to log in to the information processing system 50. A login is an authentication act to access system resources with pre-registered account information when using various services on a computer or the internet. The account information differs depending on the authentication methods (A) to (F) described above.

Further, the information processing system 50 includes a user information storage unit 57, a tenant information storage unit 58, a device setting information storage unit 62, and a device information storage unit 64 implemented by the HD 504, RAM 503, and the like illustrated in FIG. 3. The above described elements are described with reference to Tables 2 to 5.

TABLE 2

| Parameter | Description | Example |
|---|---|---|
| Tenant ID | ID for Tenant which user belongs | tenant 1234 |
| User ID | ID for user unique within tenant | user9876 |
| Password | Password | password |
| Password flag | Indicates whether password is set | True |
| Last name | Last name of user | Smith |
| First name | First name of user | John |
| E-mail address | E-mail address of user | john@example.com |
| Display language | Language used on screens and e-mails | English |
| Country | Country which user belongs | Japan |
| Status | Status of user's account | Valid |
| Time zone | Time zone of user | Asia/Tokyo |
| Role | Administrator or general user | Administrator |
| UUID | Unique ID for user | |
| External service account information | Information on the account in the external service linked by user | External service ID: user 9999 |

TABLE 2-continued

| Parameter | Description | Example |
|---|---|---|
| List of available service authority information | List of available service authority information for user | Service 1, service 2 |

Table 2 describes an example of user information stored in the user information storage unit 57. "Tenant ID" is identification information indicating the tenant to which the user belongs. "ID" is an abbreviation for "identifier," and indicates an identification or identification information. ID is any one of a name, a symbol, a character string, a numerical value, or a combination of at least two of these items, which is used for identifying a particular object from among a plurality of objects. The same applies to IDs other than the tenant IDs. "User ID" is identification information that uniquely indicates a user within the tenant. Since the user ID is unique within a tenant, the user ID may be duplicated between different tenants. "Password" may be a part of account information. "Password flag" indicates that the password is set if "True" and not set if "False". "Last name" is the surname (last name) of the user. "First name" is the first name of the user. "E-mail address" is the user's e-mail address. The e-mail addresses are unique worldwide and are duplicated between different tenants. For this reason, the e-mail address is often used as identification information for identifying a user. "Display language" is the written language when the terminal device displays various screens and e-mails. "Country" is the country or region to which the user belongs. "Status" is the status of the user's account. An account is a user's right to log in to the information processing system 50. There are at least three account statuses: "valid", "invalid" or "account locked". If user information is temporarily registered, the user information is invalid, and the user information becomes valid by full registration. The administrator can invalidate the user information even after the user information has been validated. Account lock is set when the user makes mistakes in entering a password several times. A locked account is different from an invalid account in that, for example, the locked account returns to a valid account after a period of time or remain counted as users belonging to the tenant. In addition, an invalid account may be due to expiration. "Time zone" is the time zone (Coordinated Universal Time (UTC)) of a country or region in which the user operates. "Role" indicates what kind of authority the account has. In the present embodiment, the role is an administrator, or a general user. When a general user and an administrator are not particularly distinguished, the general user and the administrator are referred to as users. "Universally Unique Identifier (UUID))" is identification information that uniquely indicates a user and is used when the information processing system 50 identifies the user. "External service account information" is information on the account in the external service 70 that the user has registered in cooperation with (identification information in the external service 70). "List of available service authority information" is a list of services available to the user.

TABLE 3

| Parameter | Description | Example |
|---|---|---|
| Tenant ID | ID for Tenant which user belongs | tenant 1234 |

TABLE 3-continued

| Parameter | Description | Example |
|---|---|---|
| Tenant name | Name of tenant | Test tenant |
| Display language | Language used on screens and e-mails | English |
| Country | Country which user belongs | Japan |
| Status | Status of user's account | Valid |
| Time zone | Time zone of user | Asia/Tokyo |
| Login setting | Authentication method permitted by tenant when logging into web application | Login by e-mail address and password permitted |

Table 3 describes an example of tenant information stored in the tenant information storage unit 58. "Tenant ID" is the same as in Table 2. "Tenant name" is the name of the tenant (the name called by the user). "Display language" is a language for displaying characters on the screens, e-mails, and the like. "Country" a country or region to which the tenant belongs. "Status" includes valid and invalid statuses of the tenant. Invalid status is a state in which the tenant cannot receive the service due to the termination of the contract. "Time zone" is the time zone (UTC) of the country or region where the tenant operates. "Login setting" is an authentication method permitted by the tenant when the user logs in to the information processing system 50 (refer to Table 5).

TABLE 4

| Parameter | Description | Example |
|---|---|---|
| Tenant ID | ID for tenant who owns electronic device | tenant 1234 |
| Machine number | ID for electronic device | K001 |
| ... | ... | ... |

Table 4 describes an example of device information stored in the device information storage unit 64. "Tenant ID" is the same as in Table 2. The tenant ID indicates the tenant that holds the device. "Machine number" is identification information of an electronic device for which an authentication method is set by the administrator. There are as many machine numbers as there are electronic devices 10 owned by the tenant.

TABLE 5

| Parameter | Description | Example | Default |
|---|---|---|---|
| Tenant ID | ID for tenant who owns electronic device | tenant 1234 | |
| Set value for authentication method using user ID | Set value indicating whether to allow login by user ID | ON or OFF | |
| Set value for authentication method using e-mail address | Set value indicating whether to allow login by e-mail address | ON or OFF | |
| Set value for authentication method using user selection | Set value indicating whether to allow login by user selection | ON or OFF | |
| Set value for authentication method using PIN code | Set value indicating whether to allow login by PIN code | ON or OFF | |
| Set value for authentication method using IC card | Set value indicating whether to allow login by IC card | ON or OFF | default |
| Set value for all | Set value indicating | ON or OFF | |

TABLE 5-continued

| Parameter | Description | Example | Default |
| --- | --- | --- | --- |
| authentication methods | whether to allow all login methods | | |

Table 5 describes an example of the device setting value information stored in the device setting information storage unit 62. "Tenant ID" is the same as in Table 2. The tenant ID indicates the tenant that holds the device. "Set value for authentication method using the user ID" is a set value indicating whether to allow login by the user ID. "Set value for authentication method using the e-mail address" is a set value indicating whether to allow login by the e-mail address. "Set value for authentication method using the user selection" is a set value indicating whether to allow login by the user selection. "Set value for authentication method using the PIN code" is a set value indicating whether to allow login using the PIN code. "Set value for authentication method using the IC card" is a set value indicating whether to allow login using the IC card. "Set value of all authentication methods" is a set value indicating whether to allow all authentication methods.

The ON or OFF of the items in the example of Table 5 can be set by the administrator. For example, the set value of login by the IC card indicates whether the user can log in with the IC card (set value: ON) or not (set value: OFF).

The administrator can set the default authentication method. In Table 5, login by the IC card is set as the default.

Figure 6:
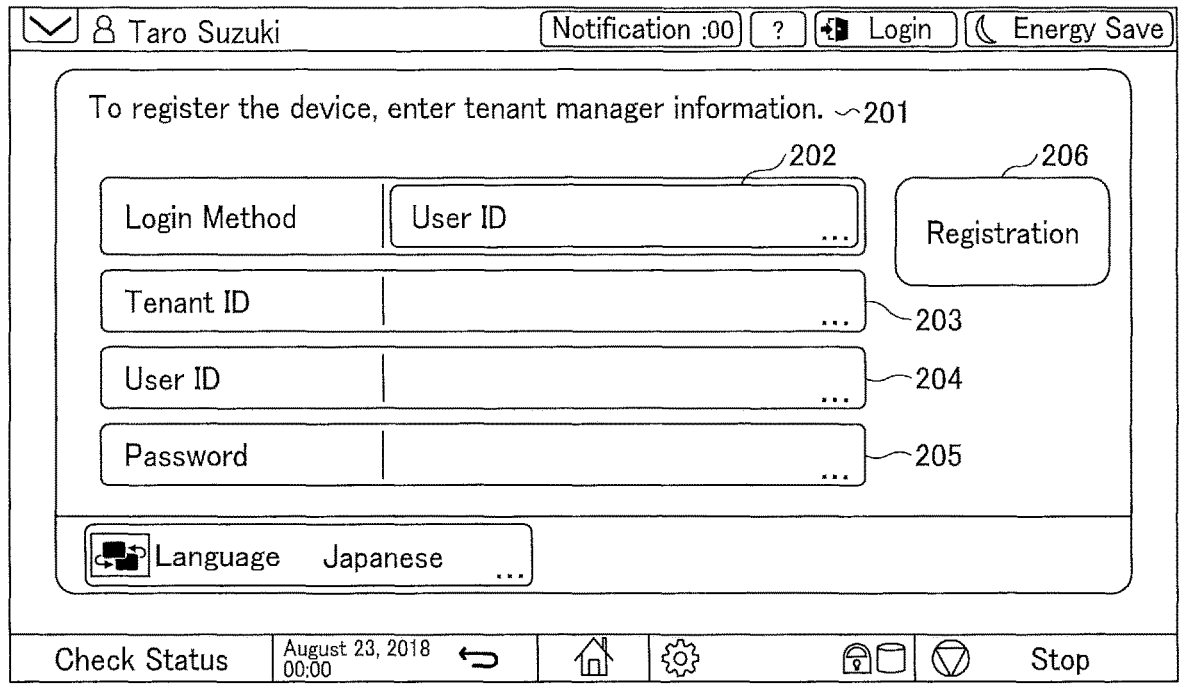
FIG. 6 is a diagram illustrating an example of a device registration screen displayed by the electronic device when an administrator registers the electronic device in the information processing system.

FIG. 6 is a diagram illustrating an example of a device registration screen 200 displayed by the electronic device when the administrator registers the electronic device in the information processing system 50. The device registration screen 200 includes a message 201 "Please enter the tenant administrator information to register this device", a login method field 202, a tenant ID field 203, a user ID field 204, a password field 205, and a registration button 206. The login method field 202 is a field for the administrator to select the login method for the electronic device. The following input fields are displayed according to the method selected in the login method field 202. When the authentication method is the "user ID", the tenant ID, the user ID, and the password are required. In the tenant ID field 203, the tenant ID of the customer who owns the electronic device is input. In the user ID field 204, identification information assigned to the device (which may not be duplicated in the tenant) is input. In the password field 205, a password for authentication is input. The registration button 206 is a button for the electronic device 10 to send the account information input to the device registration screen to the information processing system 50. The electronic device 10 transmits the account information to the information processing system 50 together with the machine number. The account information is used for administrator authentication, and if the authentication is successful, the device management unit 63 registers the machine number and the tenant ID in the device information storage unit 64.

A login screen corresponding to the authentication method is described with reference to FIGS. 7 to 11. The authentication method and required account information are described. (A) For authentication by the user ID, a user ID, a tenant ID, and a password are required. (B) For authentication by the e-mail address, an e-mail address, and a password are required. (C) For authentication by the user selection, a user ID, a tenant ID, and a password are required. (D) For authentication by the PIN code, a PIN code (numbers, symbols, alphabets, or combinations thereof that have a certain number of unique digits) is required. (E) For authentication by the IC card, a card number stored in the IC card, etc. is required. In addition, the account information includes biometric authentication information such as fingerprints and faces. In this case, an authentication method corresponding to the biometric authentication information is prepared.

Figure 7:
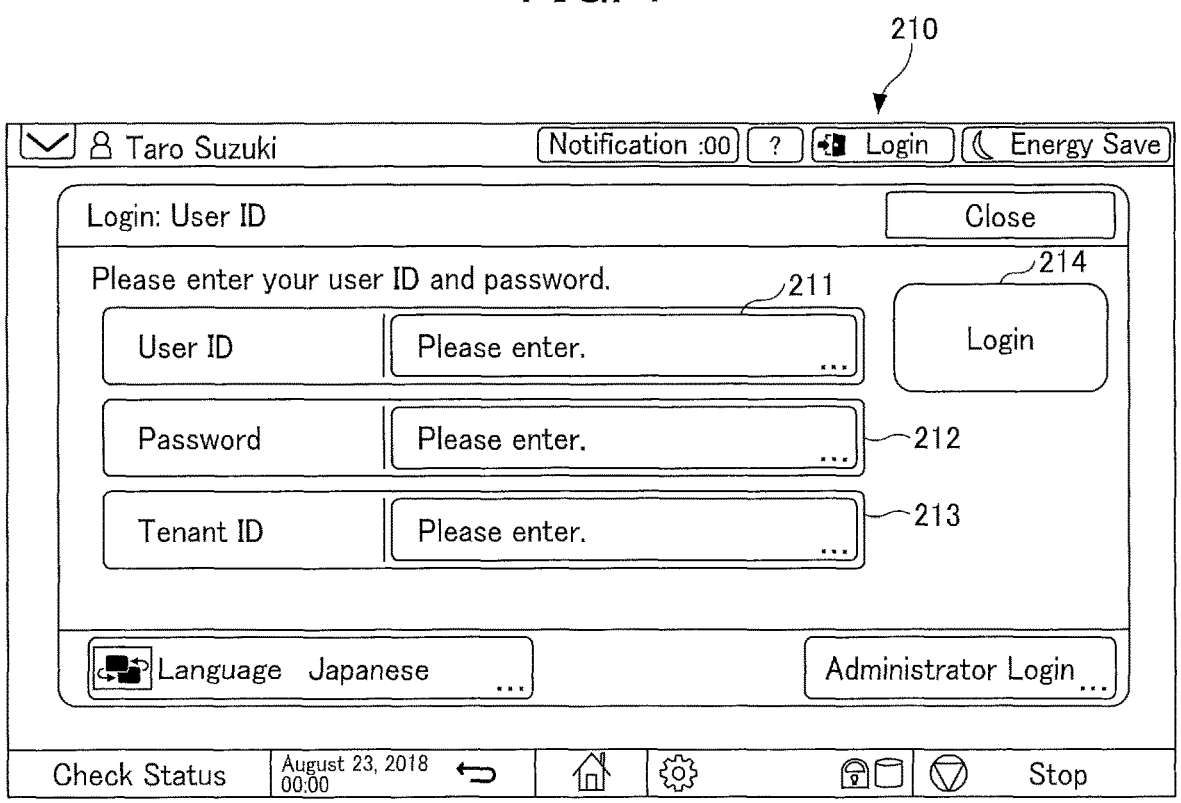
FIG. 7 is a diagram illustrating an example of a login screen displayed by the electronic device when authentication method is a user identifier (ID)

FIG. 7 illustrates an example of the login screen 210 displayed by the electronic device 10 when the authentication method is the user ID. The login screen 210 of FIG. 7 includes a user ID field 211, a password field 212, a tenant ID field 213, and a login button 214. The user inputs the user ID in the user ID field 211, the password in the password field 212, the tenant ID in the tenant ID field 213, and presses the login button 214. The operation reception unit 14 receives the operation, and the authentication processing unit 43 transmits the account information to the information processing system 50 through the third communication unit 12. Further, the authentication processing unit 43 receives the authentication result through the third communication unit 12 and notifies the main body authentication unit 45.

Figure 8:
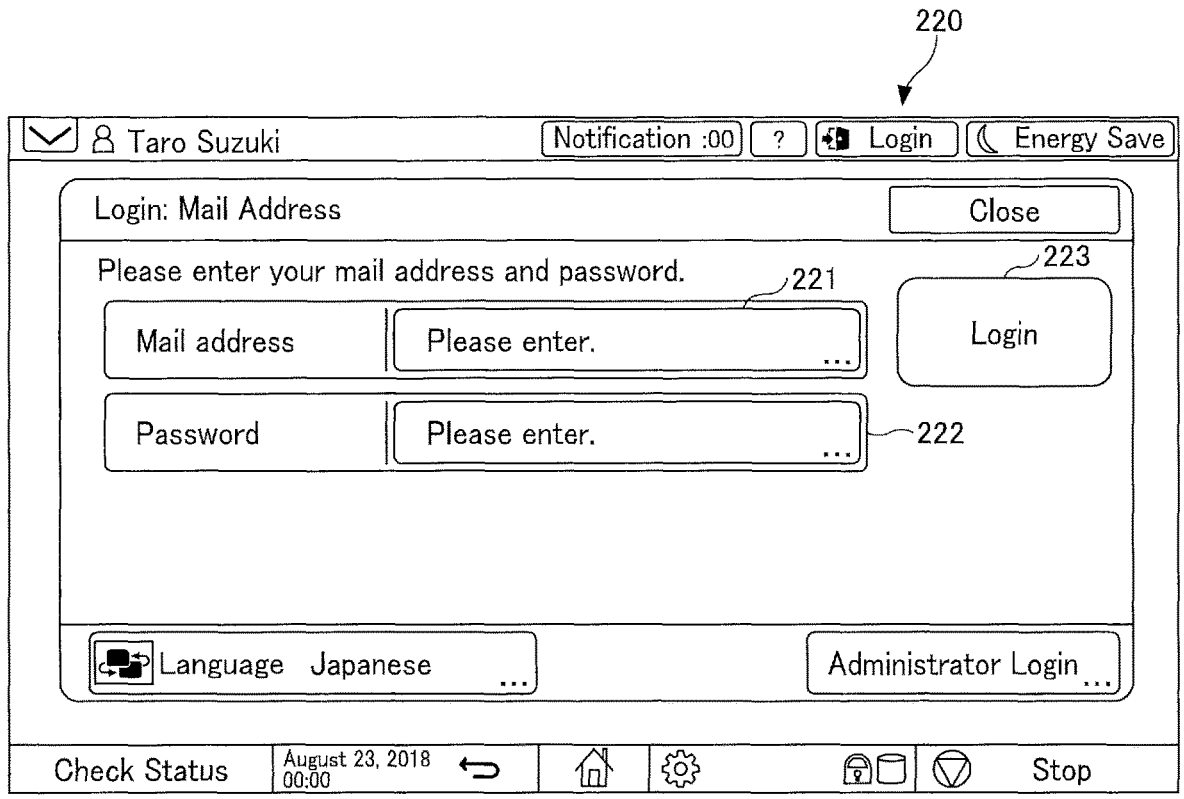
FIG. 8 is a diagram illustrating an example of the login screen displayed by the electronic device when the authentication method is an e-mail address.

FIG. 8 illustrates an example of a login screen 220 displayed by the electronic device 10 when the authentication method is the e-mail address. The login screen 220 of FIG. 8 includes an e-mail address field 221, a password field 222, and a login button 223. The user inputs the e-mail address in the e-mail address field 221, the password in the password field 222, and presses the login button 223. The tenant ID is not required because the e-mail address is guaranteed to be unique worldwide (the user ID is guaranteed to be unique only within the tenant). The operation reception unit 14 receives the operation, and the authentication processing unit 43 transmits the account information to the information processing system 50 through the third communication unit 12. Further, the authentication processing unit 43 receives the authentication result through the third communication unit 12 and notifies the main body authentication unit 45.

Figure 9:
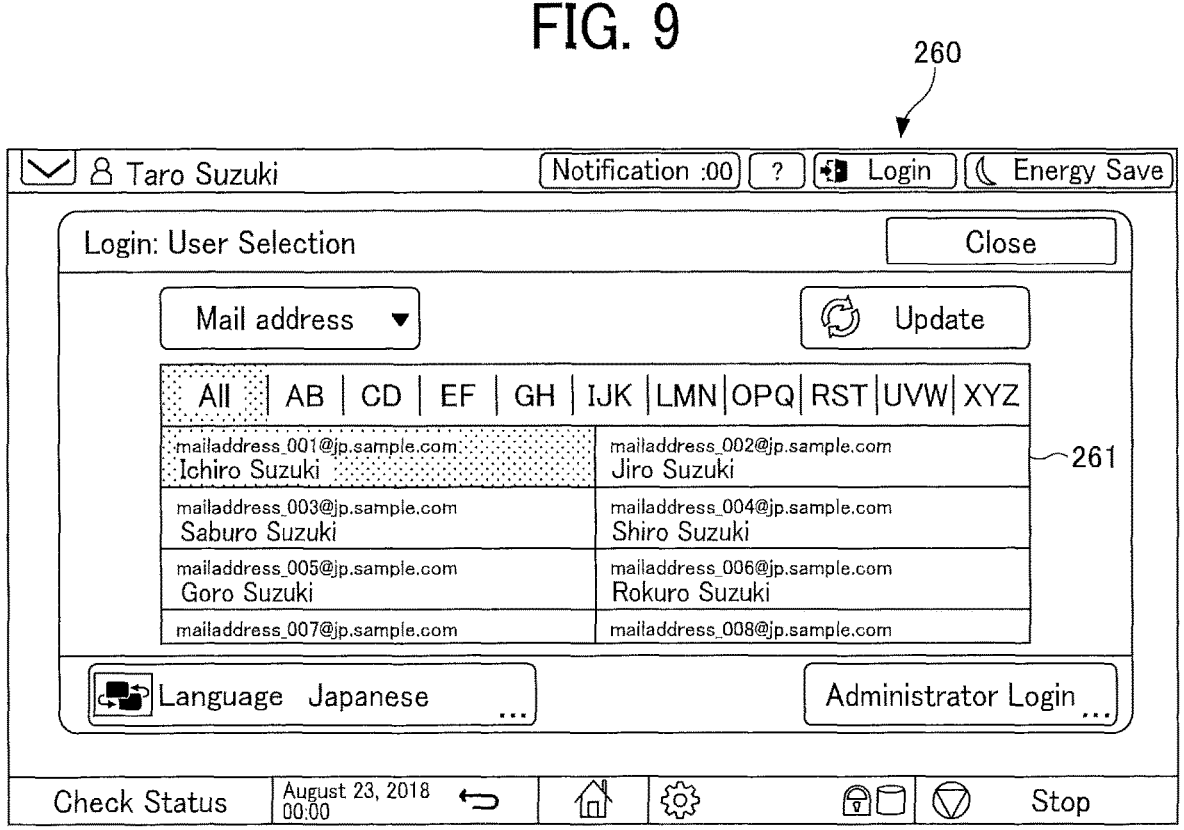
FIG. 9 is a diagram illustrating an example of the login screen displayed by the electronic device when the authentication method is user selection.

FIG. 9 illustrates an example of the login screen 260 displayed by the electronic device 10 when the authentication method is the user selection. In other words, it is not necessary to enter the e-mail address, which improves convenience. The login screen 260 of FIG. 9 includes an e-mail address list 261. The e-mail address list 261 is displayed based on, for example, an employee's address book. The user selects the e-mail address of the user from the e-mail address list 261. In response to inputting the selection, the e-mail address list 261 switches to the password field. The user enters the password in the password field and presses the login button.

Figure 10:
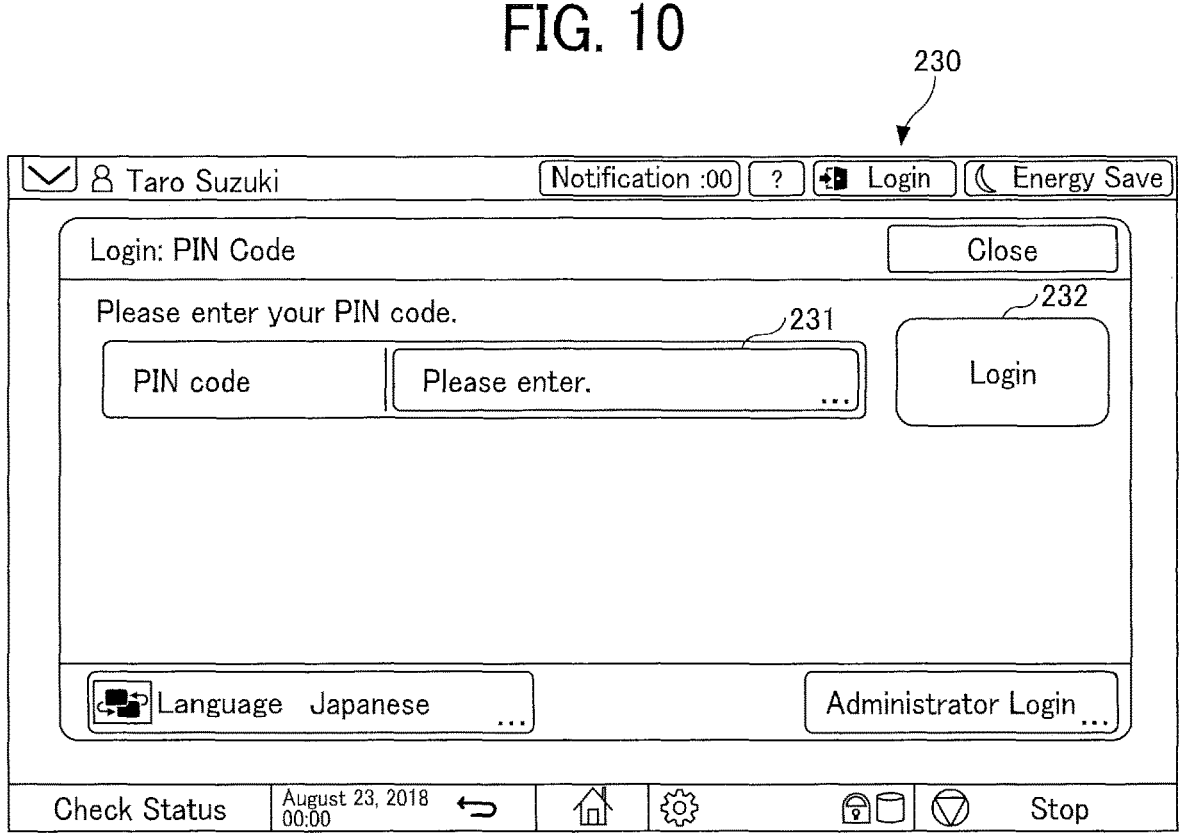
FIG. 10 is a diagram illustrating an example of the login screen displayed by the electronic device when the authentication method is a personal identification number (PIN) code.

FIG. 10 illustrates an example of a login screen 230 displayed by the electronic device 10 when the authentication method is the PIN code. The login screen 230 of FIG. 10 includes a PIN code field 231 and a login button 232. The user inputs the PIN code in the PIN code field 231 and presses the login button 232. The operation reception unit 14 receives the operation, and the authentication processing unit 43 transmits the account information to the information processing system 50 through the third communication unit 12. Further, the authentication processing unit 43 receives the authentication result through the third communication unit 12 and notifies the main body authentication unit 45.

Figure 11:
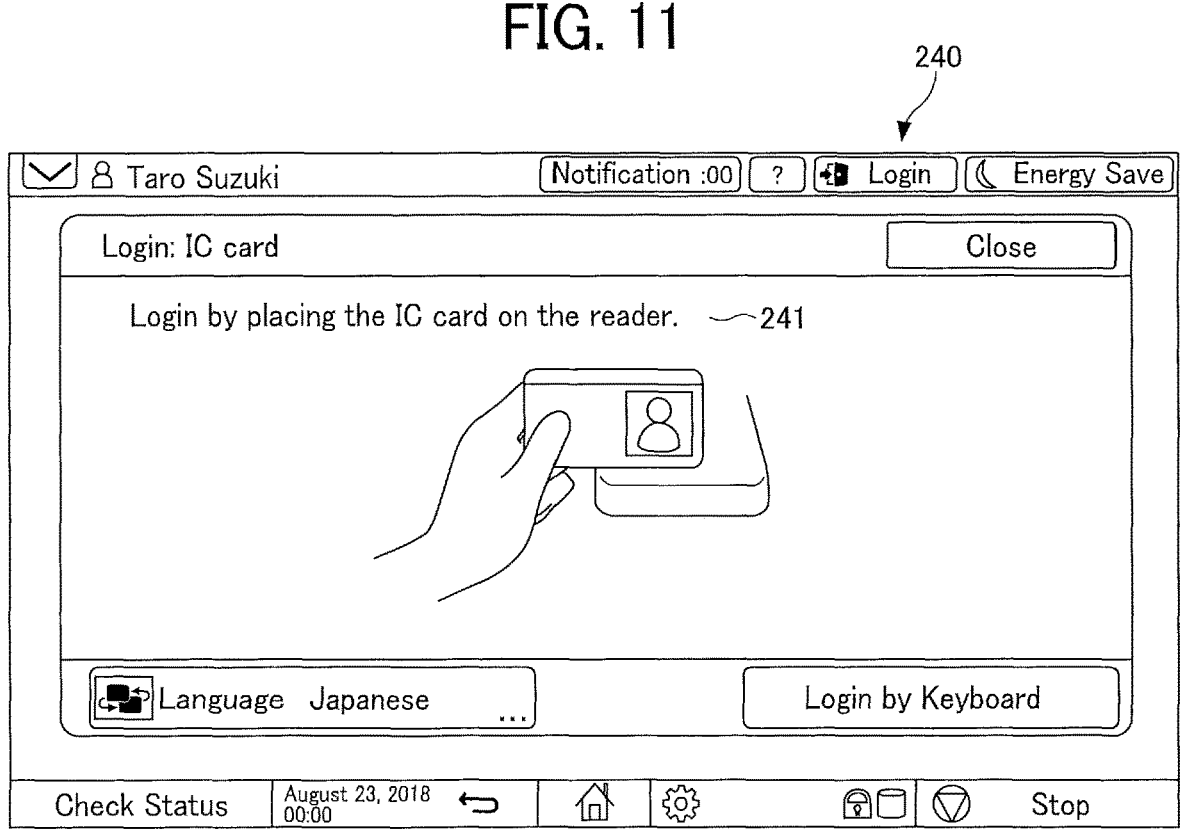
FIG. 11 is a diagram illustrating an example of the login screen displayed by the electronic device when the authentication method is an IC card.

FIG. 11 illustrates an example of a login screen 240 displayed by the electronic device 10 when the authentication method is the IC card. On the login screen 240 of FIG. 11, a message 241 "Please hold the IC card over the reader to log in." is displayed. When this screen is displayed, the short-range communication circuit 920 transmits a radio wave and starts searching for the IC card. When the IC card reaches the communication range, the IC card communication unit 42 receives the card number from the IC card. The authentication processing unit 43 transmits the account information to the information processing system 50 through the third communication unit 12. Further, the authentication processing unit 43 receives the authentication result through the third communication unit 12 and notifies the main body authentication unit 45.

Figure 12:
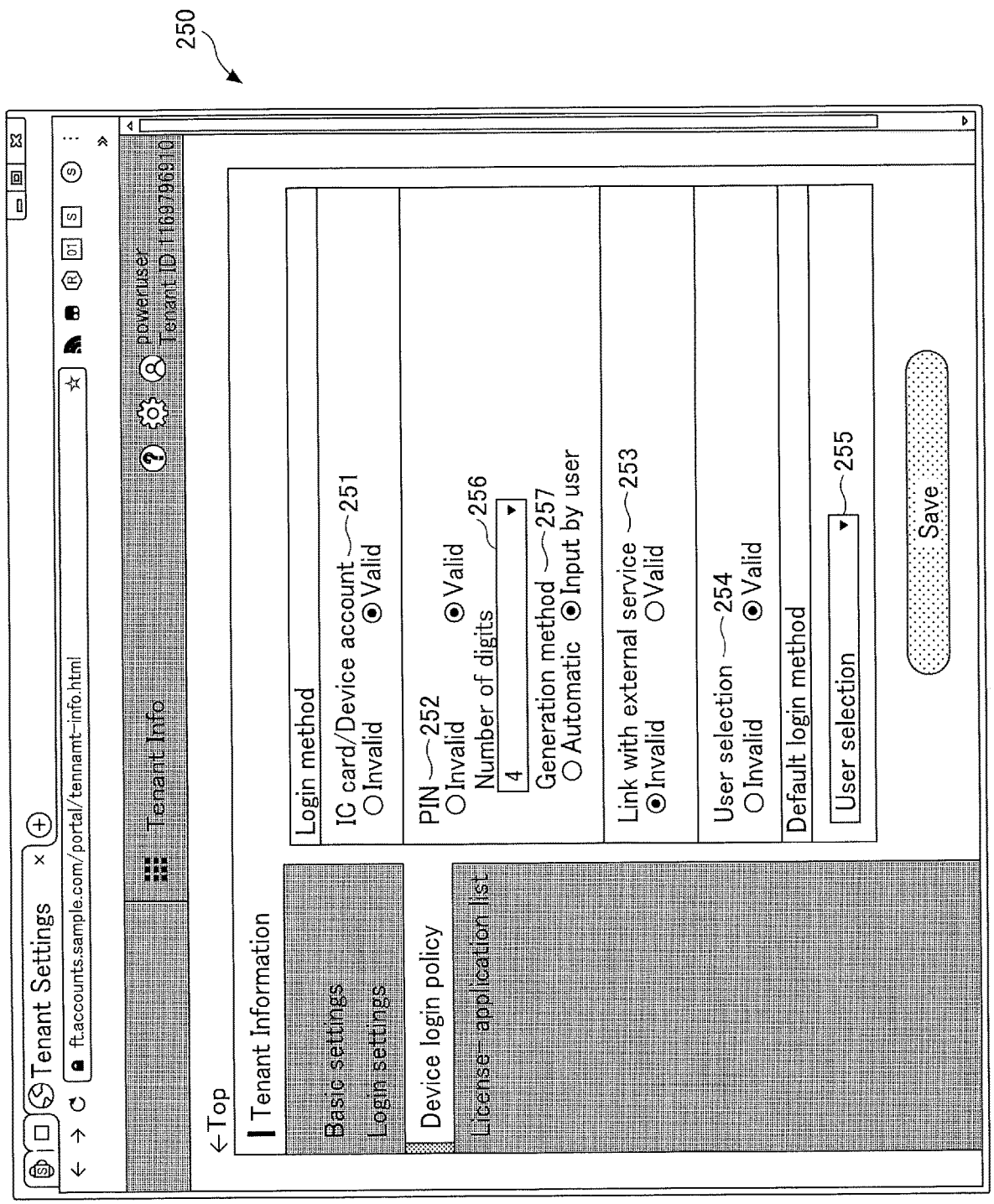
FIG. 12 is a diagram illustrating an example of an authentication method setting screen displayed by a second terminal device.

An authentication method setting screen 250 set by the administrator is described with reference to FIG. 12. FIG. 12 is an example of the authentication method setting screen 250 displayed by the second terminal device 30. The administrator is logged in to the information processing system and the tenant ID is identified to display the authentication method setting screen 250.

The authentication method setting screen 250 is a screen for the administrator to set an authentication method for each electronic device 10. It is assumed that the authentication method setting screen 250 of FIG. 12 is common to all the electronic devices 10 owned by the tenant. However, the administrator may be able to set the authentication method for each electronic device 10. In this case, the administrator inputs the machine number before or after the display of the authentication method setting screen 250 of FIG. 12.

The authentication method setting screen includes an IC card login setting field 251, a PIN code login setting field 252, an external service link setting field 253, a user selection field 254, and a default authentication method setting field 255. The IC card login setting field 251 receives whether to validate or to invalidate the IC card login. The PIN code login setting field 252 received whether to validate or to invalidate the login by PIN code. Further, the number of digits of the PIN code is received in a number of digits column 256, and a generation method is received in a generation method column 257. The external service link setting field 253 receives whether to validate or to invalidate login by linking with an external service. The external service is, for example, a commercial or general-purpose cloud service that supports OAUTH, OPENID, and the like. GOOGLE (registered trademark), OFFICE365 (registered trademark), FACEBOOK (registered trademark), etc. are known. The user selection field 254 receives whether to validate or to invalidate login by selecting the user's e-mail address (FIG. 9) as the authentication method using the e-mail address. The default authentication method setting field 255 receives the default (initial setting) authentication method.

The content set by the administrator on the authentication method setting screen 250 is received by the fourth communication unit 52 of the information processing system 50, and the device setting management unit 61 stores the settings in the device setting information storage unit 62.

In FIG. 12, whether the login by the user ID is valid or invalid, and whether the login by the e-mail address is valid or invalid are not set. This is because these settings are validated in principle. However, these settings may also be set by the administrator in the same manner.

In addition, the administrator can confirm the tenant ID, tenant name, country information, time zone, and the like. Further, the authentication method for the authentication method setting screen 250 can be set by operating the second terminal device 30. The options are the e-mail address login, user ID, link with external services, or all of these. In addition, the administrator can display a list of licenses (applications) that can be used by the tenant by operating the second terminal device 30.

Figure 13:
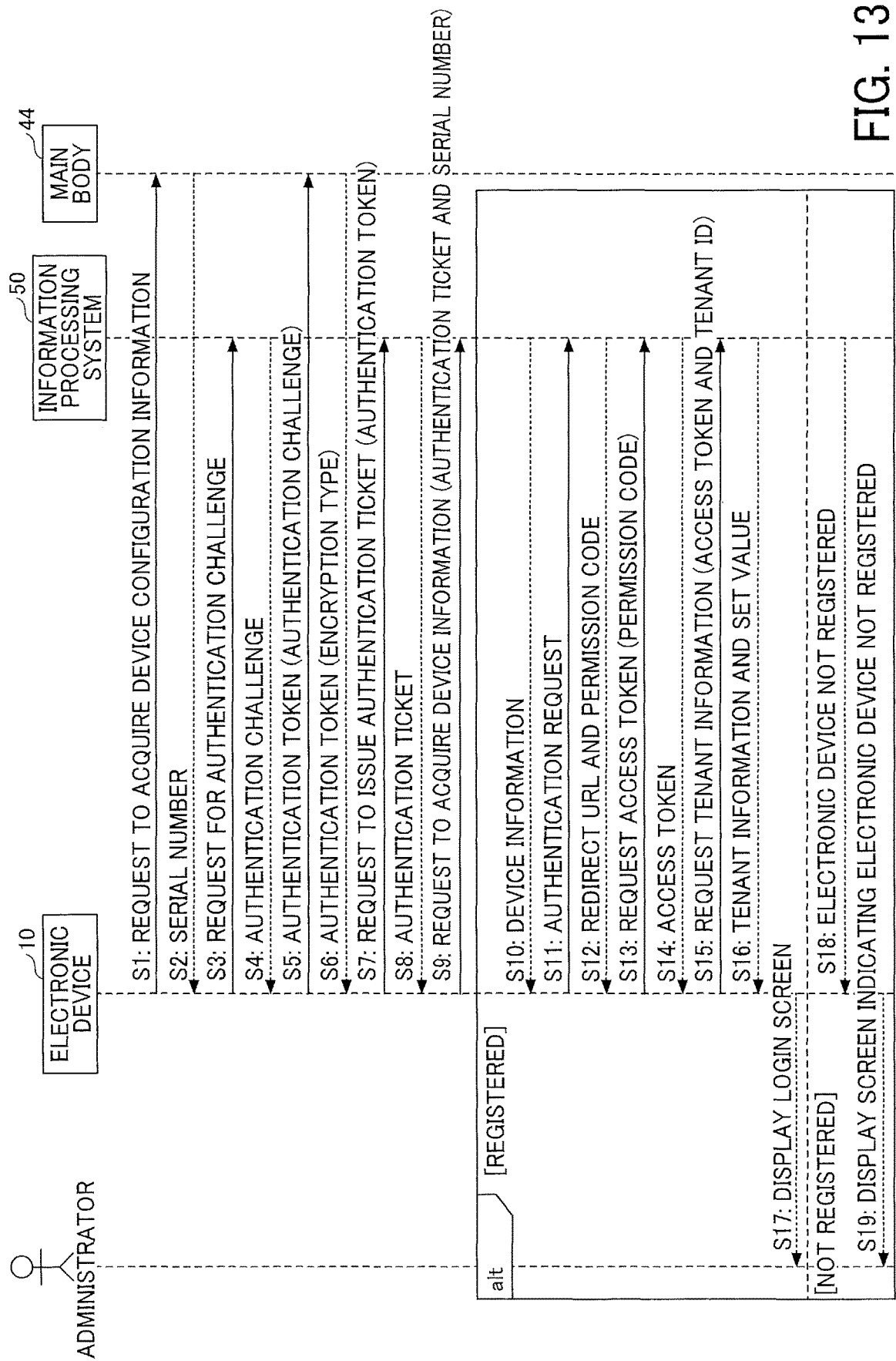
FIG. 13 is a sequence diagram illustrating a process from when an authentication application is started until the login screen is displayed.

A process executed by the electronic device to display the login screens of FIGS. 7 to 11 is described with reference to FIG. 13. FIG. 13 is a sequence diagram illustrating an example of the process from when an authentication application is started until the login screen is displayed. The authentication processing unit 43 is implemented by the authentication application.

In step S1, the authentication processing unit 43 requests the main body of the electronic device 10 to acquire device configuration information. The device configuration information is information related to the configuration and functions of the electronic device 10. For example, color or monochrome, double-sided or single-sided, paper size, combined printing, staples, etc. The machine number is also included in the device configuration information.

In step S2, the web API 46 of the main body transmits the machine number to the authentication processing unit 43. Since the web API 46 is an interface, transmission by the web API 46 indicates that the authentication processing unit 43 calls the web API 46 to acquire or notify the information. In the present embodiment, "transmission by the web API 46" is used for the sake of simplicity.

In step S3, the authentication processing unit 43 requests the information processing system 50 to issue an authentication challenge for the electronic device 10 through the third communication unit 12. The authentication challenge is information used in an authentication method called challenge and response authentication.

In step S4, the fourth communication unit 52 of the information processing system 50 receives a request for issuing an authentication challenge, and the authentication permission unit 56 generates a different data string each time determined based on random numbers. This data string is called the authentication challenge. The fourth communication unit 52 transmits the authentication challenge to the electronic device 10.

In step S5, the third communication unit 12 of the electronic device 10 receives the authentication challenge, and the authentication processing unit 43 requests the main body 44 of the electronic device 10 to specify the authentication challenge and issue an authentication token.

In step S6, the main body authentication unit 45 of the main body of the electronic device 10 generates the authentication token. The main body authentication unit 45 converts the authentication challenge into a hash value by a hash function. In addition, the main body authentication unit 45 encrypts the hash value. The encrypted hash value is the authentication token. The authentication token is a one-time password. The main body authentication unit 45 also transmits information on the encryption type (Rivest Cipher 4 (RC4), Data Encryption Standard (DES), Triple Data Encryption Algorithm (3DES), Advanced Encryption Standard (AES), etc.) used at the time of creation.

In step S7, the authentication processing unit 43 requests the information processing system 50 to issue an authentication ticket by designating the authentication token through the third communication unit 12.

In step S8, the fourth communication unit 52 of the information processing system 50 receives the authentication ticket issuance request, and the authentication permission unit 56 verifies the authentication token. That is, the authentication challenge transmitted in step S4 is converted into a hash value, and whether the hash value matches the hash value transmitted from the electronic device 10 is determined. If the hash values match, it is determined that the electronic device 10 has been authenticated, and an authentication ticket that guarantees identity is issued to the electronic device 10. The fourth communication unit 52 transmits the authentication ticket to the electronic device 10.

In step S9, the third communication unit 12 of the electronic device 10 receives the authentication ticket, and the authentication processing unit 43 specifies the authentication ticket and the machine number to the information processing system 50 through the third communication unit 12 to obtain device information. The device information is information related to the device. In the present embodiment, the device information is not required, and an inquiry is made as to whether or not the electronic device 10 is registered.

When the electronic device is registered in the information processing system 50, steps S10 to S17 are executed.

In step S10, the fourth communication unit 52 of the information processing system 50 receives the request for device information, and the authentication permission unit 56 collates the issued authentication ticket with the received authentication ticket. If the authentication tickets match, the device management unit 63 acquires the device information specified by the machine number from the device information storage unit 64 and transmits the device information to the electronic device 10 through the fourth communication unit 52. In the present embodiment, it is assumed that the tenant ID is included in the device information.

In step S11, the third communication unit 12 of the electronic device 10 receives the device information. Since the electronic device 10 has already been registered, the authentication processing unit 43 requests a resource owner of OAUTH through the third communication unit 12 for authorization by designating the authentication ticket. Authorization is authority granted to electronic devices.

In step S12, the third communication unit 12 of the electronic device 10 receives a redirect uniform resource locator (URL) and an authorization code from the resource owner. The redirect URL is a URL for reconnecting to the information processing system 50. The authorization code is identification information indicating contents of authority.

In step S13, the third communication unit 12 of the electronic device 10 connects to the redirect URL, specifies an authorization code to the information processing system 50, and requests an access token. The access token determines an accessible data range identified by the authorization code.

In step S14, the fourth communication unit 52 of the information processing system 50 receives the request for the access token, and the authentication permission unit 56 transmits the access token determined by the authorization code to the electronic device 10.

In step S15, the third communication unit 12 of the electronic device 10 receives the access token, and the processing control unit 15 specifies the access token and the tenant ID to request tenant information. The tenant ID is included in the device information.

In step S16, the fourth communication unit 52 of the information processing system 50 receives the tenant information and the acquisition request of the set value, the tenant information management unit 55 acquires the tenant information from the tenant information storage unit 58, and the device setting management unit 61 acquires the set value from the device setting information storage unit 62. The set value may include all the information in Table 5. The fourth communication unit 52 transmits the tenant information and the set value to the electronic device 10.

In step S17, the third communication unit 12 of the electronic device 10 receives the tenant information and the set value, and the processing control unit 15 identifies the default authentication method from the permitted authentication methods. In the present embodiment, the default authentication method is the IC card. The display control unit 13 displays the login screen corresponding to the default authentication method on the display. The set value includes whether the IC card login is valid or invalid. When the default IC card login is valid, the display control unit 13 displays the login screen with the IC card. When the IC card login is invalid, the display control unit 13 displays the login screen according to permitted authentication methods (A) to (D). Which login screen to display may be decided in advance, or the last displayed login screen may be displayed.

Further, when the IC card login setting value acquired last time is "invalid" and the IC card login setting value acquired this time is "valid", the processing control unit 15 validates the settings related to the IC card of the browser information storage unit 16 of the electronic device 10 (sets the iccard). That is, the set value of the browser information storage unit 16 of the electronic device 10 is changed according to the set value acquired this time. In this case, the electronic device 10 restarts as necessary. The IC card login setting value obtained last time is the value of the flag stored in the browser information storage unit 16.

On the contrary, when the IC card login setting value acquired last time is "valid" and the IC card login setting value acquired this time is "invalid", the processing control unit 15 validates the setting related to the IC card of the browser information storage unit 16 of the electronic device 10 (NULL is set). In this case, the electronic device 10 restarts as necessary.

On the other hand, if the electronic device 10 is not registered in the information processing system 50, steps S18 and S19 are executed.

In step S18, the fourth communication unit 52 of the information processing system 50 transmits to the electronic device 10 that the electronic device 10 is not registered.

In step S19, the third communication unit 12 of the electronic device 10 receives that the electronic device 10 is not registered. The display control unit 13 displays a screen indicating that the electronic device 10 has not been registered. As a result, the administrator can register the electronic device 10 from the device registration screen 200 of FIG. 6.

FIG. 14 is a sequence diagram illustrating a process in which an information processing system 50 authenticates a user using account information input to the login screen.

Steps S21 to S23 may be the same as steps S15 to S17 in FIG. 12.

In step S24, the user inputs account information (user ID, password, etc.) according to the authentication method on the login screen. The operation reception unit 14 accepts the input of account information.

In step S25, the user presses the login button displayed on the login screen. The operation reception unit 14 receives pressing of the button.

In step S26, the authentication processing unit 43 requests login to the web API 46.

In step S27, the web API 46 transmits an external authentication request to the authentication processing unit 43. The external authentication request indicates requesting authentication from the information processing system 50.

One of steps S28 to S31 is executed depending on the authentication method.

In step S28, when the authentication method is the authentication by user ID, the authentication processing unit 43 transmits the tenant ID, the user ID, and the password to the information processing system 50 through the third communication unit 12.

In step S29, when the authentication method is the authentication by e-mail address, the authentication processing unit 43 transmits an e-mail address and a password to the information processing system 50 through the third communication unit 12.

In step S30, when the authentication method is the authentication by user selection, the authentication processing unit 43 transmits the tenant ID, the user ID, and the password to the information processing system 50 through the third communication unit 12.

In step S31, when the authentication method is the authentication by PIN code, the authentication processing unit 43 transmits the PIN code to the information processing system 50 through the third communication unit 12.

In step S32, when the authentication method is the authentication by IC card, the authentication processing unit 43 transmits a card number of the IC card to the information processing system 50 through the third communication unit 12.

If any of steps S28 to S32 is successful, the following steps S33 to S43 are executed.

In step S33, the authentication permission unit 56 of the information processing system 50 transmits an authentication success notice regarding the user and the user information (obtained from the user information storage unit 57) of the user identified by the success of the user authentication to the electronic device 10. The user information includes a user authentication ticket generated by authentication.

In step S34, the third communication unit 12 of the electronic device 10 receives the user information (including the user authentication ticket). The authentication processing unit 43 notifies web API 46 of the authentication success.

In step S35, the web API 46 notifies the main body 44 of the electronic device 10 that the login is successful. As a result, the control panel 940 can use the functions of the main body 44 (log in to the main body 44).

In step S36, the web API 46 notifies the authentication processing unit 43 of a login response (that a login success has been received).

In step S37, the web API 46 notifies the authentication processing unit 43 of the change in the state of the authentication service. The change of state of the authentication service indicates that the user is logged in.

In step S38, since the authentication processing unit 43 has logged in, the display control unit 13 closes the login screen.

In steps S39 to S43, the user registers in the information processing system 50, the registered name of the user who has successfully logged in on the address book of the main body 44 of the electronic device 10.

In step S39, the authentication processing unit 43 specifies the user authentication ticket to the information processing system 50 through the third communication unit 12 and requests the resource owner for authorization.

In step S40, the third communication unit 12 of the electronic device 10 receives a redirect URL and an authorization code from the resource owner.

In step S41, the third communication unit 12 of the electronic device 10 receives the redirect URL and the authorization code, and the authentication processing unit 43 connects to the redirect URL through the third communication unit 12 to obtain the access token specified by the authorization code.

In step S42, the fourth communication unit 52 of the information processing system 50 receives the request for the access token, and the authentication permission unit 56 transmits the access token based on the authorization code to the electronic device 10 through the fourth communication unit 52.

In step S43, the third communication unit 12 of the electronic device receives the access token, and the authentication processing unit 43 requests the information processing system 50 to update the information of the user through the third communication unit 12.

If the login in steps S28 to S32 fails, the following steps S44 to S48 are executed.

In step S44, the authentication permission unit 56 of the information processing system 50 notifies the electronic device 10 of the reason for failure (illegal request, authentication error, etc.) through the fourth communication unit 52.

In step S45, the third communication unit 12 of the electronic device receives the reason for failure, and the authentication processing unit 43 notifies the web API 46 that the authentication has failed.

In step S46, the web API 46 notifies the authentication processing unit 43 of a login response (that a login failure has been received).

In step S47, the web API 46 notifies the authentication processing unit 43 of the change of the login status.

In step S48, in response to a login failure notice, the display control unit 13 of the authentication processing unit 43 displays a login failure screen on the display.

If there is no response in any of steps S28 to S32 due to a communication error or the like, steps S49 to S50 are executed.

In step S49, the authentication processing unit 43 executes a timeout process because there is no response and determines that a communication error or a server error occurred.

In step S50, the display control unit 13 displays the login failure screen on the display.

As described above, in the service providing system 1 of the present embodiment, by the customer validating the IC card login setting in the information processing system 50 (server), each electronic device 10 automatically acquires the set value and the function of logging in with the IC card can be automatically validated.

The above-described embodiment is illustrative and do not limit the present invention. Thus, numerous additional modifications and variations are possible in light of the above teachings within the scope of the present invention. Any one of the above-described operations may be performed in various other ways, for example, in an order different from the one described above.

Configuration examples such as FIG. 5 are divided according to main functions in order to facilitate understanding of processing by the first terminal device 20, the second terminal device 30, the electronic device 10, and the information processing system 50. The present disclosure is not limited by the way of dividing the processing unit or the name. The processing of the first terminal device 20, the second terminal device 30, the electronic device 10, and the information processing system 50 can be divided into more processing units according to the processing content. Further, one processing unit can be divided so as to include more processing.

The apparatuses described in the examples are merely an illustration of one of several computing environments for implementing the embodiments disclosed herein. In some embodiments, information processing system 50 includes multiple computing devices, such as a server cluster. The plurality of computing devices is configured to communicate with one another through any type of communication link, including a network, shared memory, etc., and perform the processes disclosed herein.

Further, the information processing system 50 may be configured to share the disclosed processing steps, for example, FIG. 13 and FIG. 14 in various combinations. For example, a process executed by a given unit may be executed by a plurality of information processing apparatuses included in the information processing system 50. Further, the information processing system 50 may be integrated into one server device or may be divided into a plurality of devices.

As described above, the electronic device is able to acquire set values of one or more authentication methods from an extraneous source and changes an authentication method.

Each function of the embodiments described above can be implemented by one or a plurality of processing circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A service providing system comprising:
an information processing system that authenticates a user using one of multiple authentication methods and provides service to an electronic device in response to a successful login, the information processing system including
first circuitry configured to:
register device information and tenant information associated with each other;
store in one or more memories, a set value associated with the tenant information, said set value indicating whether a login is valid for each of the authentication methods; and
transmit the set value for each of the authentication methods to the electronic device in response to a request from the electronic device, said set value corresponding to the tenant information that is included in the request, and said request including the tenant information, and
the electronic device including
second circuitry configured to:
receive the tenant information from the information processing system;
transmit the request including the received tenant information to the information processing system;
receive the set value for each of the authentication methods from the information processing system; and
change a set value stored in the electronic device according to the set value of at least one of the authentication methods received from the information processing system, thereby validating or invalidating the at least one of the authentication methods.

2. The service providing system of claim 1, wherein
when the set value received from the information processing system indicates that the login by a particular authentication method of the authentication methods is valid, and the set value stored in the electronic device indicates that the login by the particular authentication method is invalid, the second circuitry is configured to change the set value stored in the electronic device to validate the login by the particular authentication method.

3. The service providing system of claim 1, wherein
when the set value received from the information processing system indicates that the login by a particular authentication method of the authentication methods is invalid, and the set value stored in the electronic device indicates that the login by the particular authentication method is valid, the second circuitry is configured to change the set value stored in the electronic device to invalidate the login by the particular authentication method.

4. The service providing system of claim 1, further comprising:
a terminal device including third circuitry configured to:
receive, from the information processing system, screen information for setting the set value indicating whether the login is valid in association with at least one of the authentication methods;
display on a display a screen based on the screen information;
receive via the screen, the set value indicating whether the login by the at least one authentication method is valid;
transmit the set value to the information processing system, and
wherein the first circuitry is configured to store in the one or more memories, the set value received from the terminal device.

5. The service providing system of claim 1, wherein
one of the authentication methods is an authentication method using an integrated circuit card.

6. The service providing system of claim 1, wherein the second circuitry is configured to:
identify a default authentication method based on the setting value.

7. The service providing system of claim 1, wherein the second circuitry is configured to:
receive an access token from a server upon determining that the login is valid, and
request the information processing system to update information of the user based on the access token.

8. A login setting method comprising:
receiving, by an electronic device, tenant information from an information processing system;
transmitting, by the electronic device, a request including the received tenant information to the information processing system so as to obtain requesting a set value indicating whether a login is valid for each of multiple authentication methods to the information processing system that authenticates a user using one of the multiple authentication methods;

receiving, by the electronic device, the set value for each of the authentication methods from the information processing system, said set value corresponding to the tenant information that is included in the request; and changing, by the electronic device, a set value stored in one or more memories according to the set value of at least one of the authentication methods received from the information processing system, thereby validating or invalidating the at least one of the authentication methods.

9. An information processing system comprising:

circuitry configured to:

register device information and tenant information associated with each other;

store in one or more memories, a set value associated with the tenant information, said set value indicating whether a login is valid for each of authentication methods;

transmit the set value for each of the authentication methods to an electronic device in response to a request from the electronic device, said set value corresponding to the tenant information that is included in the request, and said request including the tenant information, the electronic device being configured to change a set value stored in the electronic device according to the set value of at least one of the authentication methods received from the information processing system, thereby validating or invalidating the at least one of the authentication methods; and provide a service to the electronic device in response to a successful login, the successful login being determined based on authentication of a user by one of the multiple authentication methods.

* * * * *